United States Patent [19]

Resler, Jr.

[11] 4,105,009
[45] Aug. 8, 1978

[54] ANTI-POLLUTION ENGINE HEAD CONSTRUCTION

[75] Inventor: Edwin L. Resler, Jr., Ithaca, N.Y.

[73] Assignee: Cornell Research Foundation, Inc., Ithaca, N.Y.

[21] Appl. No.: 786,052

[22] Filed: Apr. 8, 1977

Related U.S. Application Data

[63] Continuation of Ser. No. 610,298, Sep. 4, 1975, abandoned.

[51] Int. Cl.² .............................................. F02F 1/02
[52] U.S. Cl. ............................ 123/193 H; 123/32 E; 123/41.82 R; 123/169 R; 60/274; 60/282
[58] Field of Search ............. 123/32 E, 169 R, 193 H, 123/193 CH, 41.82 R; 60/282, 274

[56] References Cited

U.S. PATENT DOCUMENTS

| 1,281,322 | 10/1918 | Ferraris | 123/169 R |
| 1,799,225 | 4/1931 | Gerdien et al. | 123/169 R |
| 2,673,554 | 3/1954 | Thaheld | 123/32 E |

FOREIGN PATENT DOCUMENTS

| 569,702 | 2/1933 | Fed. Rep. of Germany | 123/32 E |
| 474,308 | 3/1929 | Fed. Rep. of Germany | 123/32 E |

Primary Examiner—Charles J. Myhre
Assistant Examiner—Andrew M. Dolinar

[57] ABSTRACT

An anti-pollution head construction for internal combustion engines is disclosed in which a storage chamber is formed in the head adjacent the spark plug opening, said storage chamber being in constant communication with the cylinder chamber by passages contained in the head. The storage chamber receives unburnt hydrocarbons during the compression stroke of the engine and returns the unburnt hydrocarbons to the cylinder chamber during the subsequent expansion stroke following combustion. The hydrocarbons mix with the oxides of nitrogen at a temperature of at least 2200° Rankine, thereby reducing the oxides of nitrogen to the equilibrium value. Preferably the storage chamber is annular and is arranged concentrically about the spark plug opening.

6 Claims, 1 Drawing Figure

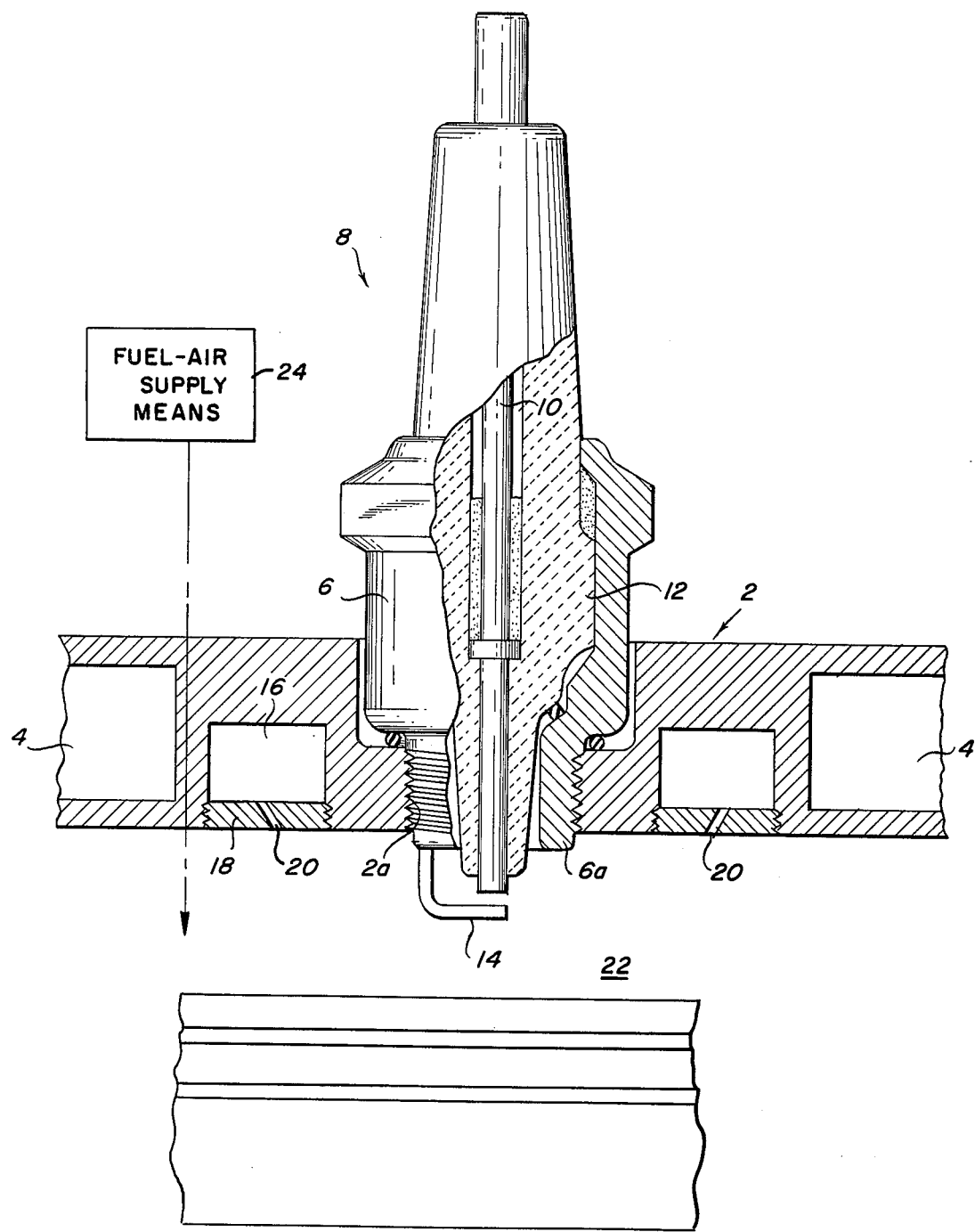

ANTI-POLLUTION ENGINE HEAD CONSTRUCTION

This is a continuation of application Ser. No. 610,298 filed Sept. 4, 1975 abandoned.

REFERENCE TO COPENDING APPLICATION

The present invention relates to a similar improved anti-pollution internal combustion engine of the type disclosed in my prior U.S. application Ser. No. 499,391 filed Mar. 8, 1974, abandoned, which in turn is a continuation-in-part of the parent application Ser. No. 399,498 filed Sept. 21, 1973, abandoned.

BRIEF DESCRIPTION OF THE PRIOR ART

As evidenced by the prior patents to Myerson Nos. 3,867,507, Kim 3,513,929 and Reed et al 3,873,671, among others, various methods and apparatus have been proposed for reducing pollutants from the exhaust gases of internal combustion engines or the like.

In my aforementioned U.S. patent application Ser. No. 449,391 filed Mar. 8, 1974, a method and apparatus is disclosed for reducing undesirable oxides of nitrogen having an excess concentration relative to an equilibrium condition determined by the temperature, pressure and composition parameters of the combustion gases, wherein unburnt hydrocarbons are mixed with the oxides of nitrogen at a temperature of at least 2200° Rankine, thereby to reduce the oxides of nitrogen to the equilibrium value. Various embodiments are disclosed of internal combustion engines containing storage chambers in communication with the cylinders for receiving unburnt hydrocarbons during a compression stroke and for returning the hydrocarbons to the cylinder during the expansion stroke following combustion, whereby the unburnt hydrocarbons mix with the oxides of nitrogen and the reduction temperature is provided by the gases within the cylinder. In the disclosed embodiments, the storage chambers are contained in or mounted on the pistons, the walls of the cylinders or the head, or the spark plugs of the internal combustion engine.

SUMMARY OF THE INVENTION

In accordance with the present invention, an improved anti-pollution head construction for internal combustion engines is provided, characterized in that the storage chamber for storing the unburnt hydrocarbons during the compression stroke of the engine and for returning the unburnt hydrocarbons during the expansion stroke is contained in the unitary metal head adjacent the spark plug opening and in continuous communication with the cylinder chamber.

Accordingly, a primary object of the present invention is to provide a head for an internal combustion engine containing a storage chamber adjacent the spark plug opening in continuous communication with the cylinder chamber.

According to a more specific object of the invention, the storage chamber is annular and is arranged concentrically about the spark plug opening. The chamber may be formed in the head by defining an annular groove in the wall surface of the head adjacent the cylinder chamber and concentrically about the spark plug opening. The groove is closed by an annular plate that is threadably connected with the walls of the groove. On the other hand, the plate could be welded to the walls of the groove to close the storage chamber. The plate contains a plurality of passages affording continuous communication between the storage chamber and the cylinder chamber. Preferably the passages are inclined inwardly toward the longitudinal axis of the spark plug opening in the direction of the cylinder chamber.

BRIEF DESCRIPTION OF THE DRAWING

Other objects and advantages of the invention will become apparent from a study of the following specification when viewed in the light of the accompanying drawing the single FIGURE of which is a detailed sectional view of the spark plug portion of a head of an internal combustion engine.

DETAILED DESCRIPTION

Referring now to the drawing, the metal head 2 is of unitary construction and contains cooling fluid passages 4 and a threaded opening 2a for receiving the externally threaded reduced portion 6a of the metal shell 6 of a conventional spark plug 8. The spark plug includes a central electrode 10 spaced from the metal shell by a ceramic insulator 12, the lower end 10a of said central electrode extending into the cylinder chamber of the engine and terminating adjacent and in spaced relation to the ground. electrode 14 which is connected with the lower extremity of the reduced portion of the metal shell.

In accordance with the present invention, the head 2 contains an annular storage chamber 16 arranged concentrically about the spark plug opening 2a. The storage chamber is defined by an annular groove formed in the wall surface of the head adjacent the cylinder chamber, which groove is closed by an annular metal plate 18 that is preferably threadably connected with the walls of the groove. The plate contains a plurality of passages 20 that afford continuous communication between the storage chamber and the cylinder chamber. Preferably the passages are angularly inclined in the direction of the cylinder chamber toward the longitudinal axis of the spark plug opening. A fuel-air mixture is supplied to the working chamber 22 of the cylinder by conventional fuel-air supply means 24.

Operation

In operation, assume that the internal combustion engine operates to produce oxides of nitrogen having an excess concentration relative to an equilibrium value determined by the pressure, temperature and composition parameters of the combustion gases. During the compression stroke, the unburnt hydrocarbons are introduced into the storage chamber 16 via the passages 20. Upon ignition some of the products of combustion enter the storage chamber 16 and render the stored hydrocarbons non-combustible by mixing with them. During the subsequent expansion stroke following combustion of the fuel, the hydrocarbons are returned to the cylinder chamber for mixing with the oxides of nitrogen, and owing to the temperature of the gases in the cylinder (i.e. at least 2200° Rankine), the undesirable oxides of nitrogen content is greatly reduced to avoid pollution of the atmosphere.

While in accordance with the Patent Statutes the preferred form and embodiment of the invention has been illustrated and described, it will be apparent that changes may be made without deviating from the inventive concepts set forth above.

What is claimed is:

1. An anti-pollution internal combustion engine of the piston and cylinder type, comprising
   (a) means including a unitary metal head (2) cooperating with a piston and cylinder to define a working chamber (22), said head containing a threaded opening (2a) for receiving a spark plug (6); and
   (b) means (24) for supplying combustion fuel to said working chamber for ignition by said spark plug, said fuel supply means causing operation of the engine in a mode in which the oxides of nitrogen have an excess concentration relative to an equilibrium value determined by the pressure, temperature and composition parameters of the combustion gases;
   (c) said head containing immediately adjacent said spark plug opening a closed storage chamber (16), and passages means (20) affording continuous communication between said storage chamber and said working chamber, said storage chamber and said passage means being arranged
      (1) to receive unburnt hydrocarbons during the compression stroke of the engine, and
      (2) to return the hydrocarbons to the working chamber during the subsequent expansion stroke following combustion of the fuel for mixing with the oxides of nitrogen to reduce the same to the equilibrium value;
   (d) said head further containing cooling passage means (4) immediately adjacent said closed storage chamber.

2. Apparatus as defined in claim 1, wherein said storage chamber is annular and is concentrically arranged about the spark plug opening in the head.

3. Apparatus as defined in claim 2, wherein said storage chamber is defined by an annular groove contained in the wall surface of the head adjacent the cylinder, and further including an annular plate connected with the head for closing said chamber, said passages being contained in said plate.

4. Apparatus as defined in claim 3, wherein said plate is threadably connected with the wall surfaces of said groove.

5. Apparatus as defined in claim 3, wherein the passages are inclined in the direction of the cylinder chamber toward the longitudinal axis of the spark plug opening.

6. The method of operating an anti-pollution internal combustion engine of the piston and cylinder type including a metal head which cooperates with the piston and cylinder to define a working chamber, said head containing an opening for receiving a spark plug, and a storage chamber immediately adjacent and independent of the spark plug opening but within the cooling jacket in continuous communication with the working chamber via passage means, which comprises the steps of
   (a) supplying a fuel-air mixture to the working chamber in a ratio to produce oxides of nitrogen having an excess concentration relative to an equilibrium value determined by the pressure, temperature and composition parameters of the combustion gases;
   (b) compressing the fuel-air mixture in the combustion chamber and simultaneously storing unburnt hydrocarbons in said cooled storage chamber;
   (c) igniting the combustion gases in the working chamber, thereby causing some of the products of combustion to enter the storage chamber and to mix with the stored hydrocarbons to render them non-combustible; and
   (d) supplying the unburnt hydrocarbons from said storage chamber to the working chamber during the subsequent expansion stroke to cause the unburnt hydrocarbons to mix with the oxides of nitrogen at a temperature of at least 2200° Rankine, thereby to reduce the oxides of nitrogen content of the combustion gases.

* * * * *